United States Patent [19]

Cooper et al.

[11] 4,364,237

[45] Dec. 21, 1982

[54] MICROCOMPUTER CONTROL FOR INVERTER-DRIVEN HEAT PUMP

[75] Inventors: Kenneth W. Cooper; Jacob E. Shaffer, Jr., both of York, Pa.

[73] Assignee: Borg-Warner Corporation, Chicago, Ill.

[21] Appl. No.: 230,486

[22] Filed: Feb. 2, 1981

[51] Int. Cl.³ .................... F25B 13/00; F25D 17/00
[52] U.S. Cl. ................................. 62/160; 62/181; 62/228
[58] Field of Search ............... 62/160, 180, 203, 227, 62/229, 181, 183, 228 B

[56] References Cited

U.S. PATENT DOCUMENTS

| | | | |
|---|---|---|---|
| 3,324,672 | 6/1967 | Sones et al. | 62/228 B |
| 4,257,238 | 3/1981 | Kountz et al. | 62/180 |
| 4,269,261 | 5/1981 | Kountz et al. | 165/29 |

Primary Examiner—Albert J. Makay
Assistant Examiner—Harry Tanner
Attorney, Agent, or Firm—Thomas B. Hunter

[57] ABSTRACT

A heat pump system in which the compressor speed is varied in response to load conditions by a programmed control system and the indoor coil fan speed, during heating operations, is proportioned to compressor speed as further modified by the outdoor air temperature.

6 Claims, 2 Drawing Figures

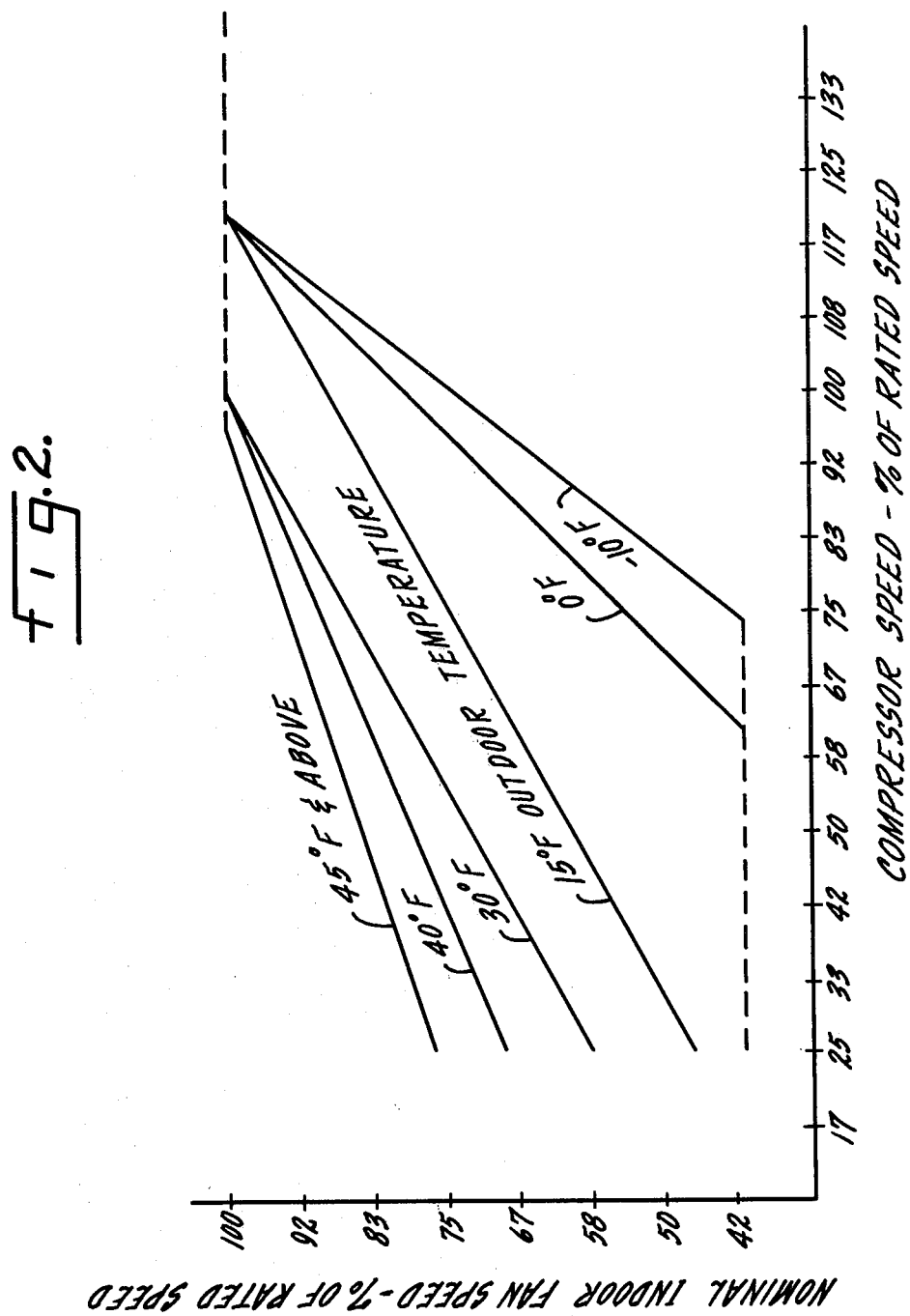

MICROCOMPUTER CONTROL FOR INVERTER-DRIVEN HEAT PUMP

CROSS-REFERENCE TO RELATED APPLICATIONS

Reference is made to the patent application Ser. No. 80,363 entitled "Microcomputer Control for an Inverter-Driven Heat Pump" filed on Sept. 28, 1979 in the names of K. J. Kountz et al. and patent application Ser. No. 80,361 entitled "Microcomputer Control for Supplemental Heating in a Heat Pump" filed on Sept. 28, 1979 in the names of K. J. Kountz et al., both of which have been assigned to Borg-Warner Corporation, assignee of the present invention. The entire disclosures of these two applications are specifically incorporated herein by reference as if the same were repeated fully.

BACKGROUND OF THE INVENTION

This invention relates generally to heat pumps and refrigeration systems and more particularly, it relates to an apparatus and method for controlling continuously and discretely the speed of the compressor in response to load conditions while varying the speed of the indoor condenser fan motor proportionally to compressor speed when operating in the heating mode. The invention has particular applications in heat pumps for heating residential dwellings, small office buildings, mobile homes and the like.

In U.S. patent application Ser. No. 80,361, referred to above, it is noted that when a heat pump system is operated in the heating mode, energy can best be conserved by varying the speed of the compressor in response to load conditions while maintaining the speed of the indoor condenser fan motor at its full rated-speed. If the heat pump cannot achieve the desired heating after the compressor speed has reached its full rated-speed, it has been found that the compressor can be designed to operate at speeds in excess of the rated-speed such as up to 150% of rated-speed or a 50% increase over rated-speed to supply additional heating prior to turning on of supplemental electric heaters. In this manner, considerable amounts of energy can be saved by maintaining the electric heaters in the off condition until it is necessary to turn them on to supply the desired heating.

After the compressor has been operated at such as 150% of rated-speed and the amount of heat is still insufficient, then a first stage of electric heat is turned on. If this first stage of heat is not adequate, second and third stages of electric heaters can be turned on additionally. The adding of the various stages of supplemental electric heaters is done progressively to achieve the desired amount of heating.

In the present invention, it has been found that additional energy savings can be achieved, and comfort of the occupants increased, by varying the indoor fan motor speed, during heating operations, in a manner proportioned to compressor speed. In addition, the rate at which the proportionality function is generated is, in turn, a function of the outdoor air temperature.

SUMMARY OF THE INVENTION

Accordingly, it is a general object of the present invention to provide a new and improved heat pump system which minimizes energy consumption.

It is an object of the present invention to provide an apparatus and method for use in a heat pump in the heating mode for controlling continuously and discretely the speed of the compressor as a function of load conditions while varying the speed of the indoor condenser fan in relation to compressor speed and the outdoor air temperature.

It is still yet another object of the present invention to provide an apparatus and method utilizing a microprocessor to provide a digitally controlled signal for digital regulation of the speed of the compressor, the speed of the indoor condenser fan motor being controlled by the microprocessor to run at a speed proportional to compressor speed with the slope being changed in response to outdoor air temperature.

In accordance with these aims and objectives of the instant invention, there is provided a refrigeration system for conditioning a space which includes a closed refrigerant circuit consisting of a compressor, a condenser, an expansion device, and an evaporator connected respectively in series. When the system is being operated in the heating mode, the system has a first sensing means for measuring the temperature of the space to be conditioned to generate an electrical signal representative of the measured temperature. A thermostat is provided for setting or selecting the reference temperature of the space to be conditioned which produces a second electrical signal representative of the selected reference temperature. A second sensing means is provided for measuring the temperature of the outdoor atmosphere to generate a third electrical signal representative of the outdoor atmosphere temperature. A fan inverter is connected to a condenser fan motor. A compressor inverter is connected to the compressor motor for controlling continuously and discretely the speed thereof between a range of 25% to at least 150% of its full rated-speed. A programmed control device in response to the measured temperature and reference temperature produces a digital signal for driving the compressor inverter. The control device is responsive to the second sensing means for causing the digital signal to increase when the outdoor temperature decreases below a predetermined set point so that the compressor inverter will drive the compressor motor up to at least 150% of its rated-speed to provide initial supplemental heating. A microprocessor having a program is operatively connected to the programmed control device for controlling the operation thereof to affect the measured temperature of the conditioned space.

BRIEF DESCRIPTION OF THE DRAWINGS

These and other objects and advantages of the present invention will be more fully apparent from the following detailed description when read in conjunction with the accompanied drawings wherein:

FIG. 2 is a graphical representation of the manner in which the indoor fan speed is controlled in proportion to compressor speed and also as a function of outdoor air temperature.

DETAILED DESCRIPTION OF THE PREFERRED EMBODIMENT

Figure 1:
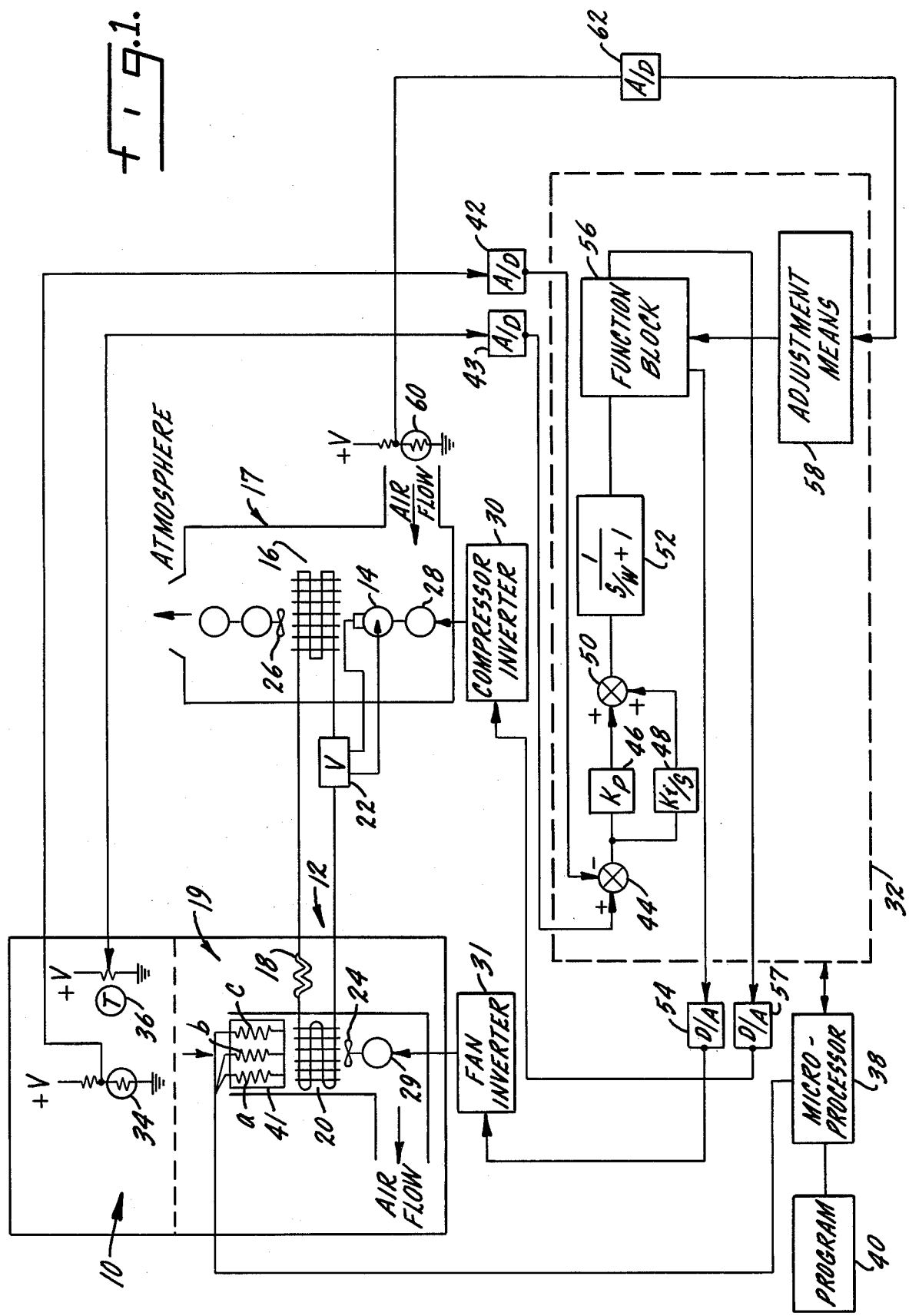
FIG. 1 is an electrical schematic block diagram of the heat pump and refrigeration system in accordance with the present invention.

As a background and to assist in the understanding of this invention, the other patent application mentioned above should be read in conjunction herewith. Referring now in detail to the drawings, there is shwon in FIG. 1 a conditioned space or zone 10, which may be a room or rooms of a residential dwelling, that is provided with a heat pump and refrigeration system designated generally by reference 12. The system 12 consists of the conventional reversible heat-pump type which includes a compressor 14, a first heat exchanger 16 located normally outside and away from the conditioned space 10, an expansion device 18 such as a capillary tube, and a second heat exchanger 20 arranged in fluid communication with the zone 10 connected respectively in series to form a closed refrigerant circuit.

As can be seen, the compressor 14 and the first heat exchanger are housed in an outdoor unit 17 while the expansion device 18 and the second heat exchanger 20 are arranged within an indoor unit 19. During the heating cycle or mode of operation, the first heat exchanger is functioning as an evaporator and the second heat exchanger is operating as a condenser. The system may also include a four-way reversing valve 22 for reversing the direction of refrigerant flow in the first and second heat exchangers so that the first heat exchanger can be operated as a condenser and the second heat exchanger can function as an evaporator in a cooling mode during the summer season. The manner of controlling the position of the valve 22 may be conventional and is not shown. For the purposes of discussion hereinafter, it is assumed that the system 12 is being operated in the heating mode with the heat exchangers 16, 20 being referred to as the evaporator and the condenser, respectively. An indoor condenser fan 24 is positioned within the indoor unit 19 in the vicinity of the condenser 20 for circulating air therethrough and into the conditioned space 10. An outdoor evaporator fan 26 is also arranged in the outdoor unit 17 adjacent the evaporator 16 for circulating of the air therethrough and out into the atmosphere. The ducts necessary to supply the conditioned air to the space 10 to be heated and to remove the cooled air to the atmosphere have not been shown. The compressor 14 is driven by a variable-speed electric motor 28 whose speed is controlled by motor speed control means such as a compressor inverter 30. The inverter 30 may be of any conventional type well-known in the art and is utilized to provide an A-C voltage which is of a varying amplitude and frequency. It should be noted that the change in the speed of the motor 28 and thus the compressor speed are directly proportional to changes in the frequency within the standard speeds of operation. The indoor condenser fan 24 is also driven by a variable-speed electric motor 29 which is controlled by motor speed control means such as an indoor fan inverter 31.

The heat pump and refrigeration system 10 is provided with a programmed control means 32 which is responsive in part to the temperatures of the conditioned space 10 as measured continuously by temperature-measuring means consisting of a temperature-sensitive resistance such as thermistor 34. The details of the programmed control means 32 will be described more fully hereinafter. The control means 32 is also responsive to the desired variable temperature setting or reference temperature of the conditioned space to be heated as determined by thermostat 36 which has been shown schematically.

The system further includes a data processor designated generally as a microprocessor 38 having a program 40 for controlling the overall operation of the control means 32 in allowing readings of inputs from the thermistor 34 and the thermostat 36. It should be understood that while the microprocessor 38 has been shown, the present invention can be implemented with various solid-state electronic components such as discrete logic circuitry interconnected to perform the desired function. The microprocessor 38 illustrated in FIG. 1 may be of any one of a number of general purpose programmable digital computers which are commonly available at present. One such microcomputer suitable for application in this invention is a microprocessor sold by Texas Instruments designated at TMS 1100 which contains a read-only-memory (ROM), a random-access-memory (RAM), and an arithmetic logic unit (ALU) on a single semiconductor chip. Another processor which can be utilized in practicing the invention is a general purpose microcomputer sold by Digital Equipment Corporation referred to as PDP-11/03 system.

A plurality of supplemental electric heaters 41 are arranged above the condenser 20 within the indoor unit 19 to provide supplemental heating when needed. As can be seen, there are shown three stages of supplemental heaters designated respectively at 41a, 41b and 41c which are under the control of the microprocessor 38. In order to conserve and minimize energy consumption, the stages of electric heaters 41 are maintained in the off-condition until it is absolutely necessary to turn them on to supply the desired heating. Prior to turning on of the electric heaters 41, the speed of the compressor is made to run at least up to 150% of rated-speed, which will be described more fully below.

The thermistor 34 produces an electrical analog signal which is proportional and representative of the present actual measured dry bulb temperature in the conditioned space where the temperature is to be controlled. This analog signal is passed through an analog-to-digital (A/D) converter 42 which provides a digital representation of the temperature measured by the thermistor 34 to the control means 32. The thermostat 36 provides also an electrical signal, either analog or digital, which is proportional to and representative of the reference temperature or desired temperature setting of the conditioned space 10. If an analog signal is produced from the thermostat 36, it is again sent through an A/D converter 43 to generate a digital representation of the dry bulb temperature setting on the thermostat.

The programmed control means includes a first summer 44 which adds algebraically the digital representation of the dry bulb set point and the continuously measured temperature to provide an error signal. This error signal is fed to a proportional gain amplifier 46 with a gain of Kp (hz/°F.) and an integrator 48 with a transfer function of Ki/s (hz/sec-°F.). The digital output from the amplifier 46 and the integrator 48 are added by a second summer 50. The digital output of the summer 50 is sent to a digital filter 52 having a transfer function of $$\frac{1}{s/w + 1}$$

wherein w has units of radians/sec. The digital output signal of the digital filter 52 is sent to a functional block 56 for determining the speed of the compressor 14 by means of a first functional relation. The digital signal from block 56 is passed through D/A converter 57 to produce an analog signal for controlling the speed of the compressor 14 via the compressor inverter 30 and the electric motor 28. A second functional relationship in function block 56 sends a digital output signal to the digital-to-analog converter (D/A) or interface 54. This digital output signal is a function of the compressor speed determined from the first functional relation and the signal from the adjustment means 58, as shown in detail in FIG. 2 and described below.

The graph of FIG. 2 illustrates how the indoor coil fan speed is programmed to vary in respect to compressor speed and outdoor air temperature. The indoor coil fan speed, shown as a percent of rated speed, is represented along the vertical axis or ordinate. The compressor speed, also expressed as a percent of rated speed, is represented along the horizontal axis or abscissa.

For a predetermined outdoor air temperature, in increments of, say, 5°, there is a unique path relating indoor fan speed to compressor speed, as programmed into the microprocessor 38. There is also a lower limit to indoor fan speed established at 40% of rated speed.

To illustrate the operation of the system, assume that the outdoor air temperature is 30° F. This program is shown by the third line from the top in FIG. 2. At the upper end of the curve, the compressor speed is 100% of rated speed and the indoor fan speed is also 100% of rated speed. As the load decreases, the compressor speed might drop off to say about 75% of rated speed. This corresponds to a fan speed of 83% of rated speed, assuming no change in outdoor air temperature. The values are determined empirically to establish the optimum relation between compressor speed and indoor fan speed for every outdoor air temperature.

As can be appreciated, the thermal load demand on the system will vary from time to time dependent upon a number of factors including variations in the indoor and outdoor temperatures. Thus, an adjustment means 58 is provided within the control means to allow an increase in the compressor speed provided the outdoor temperature is below a predetermined temperature. A thermistor 60 is included to generate an electrical analog signal representative of the outdoor temperature and is sent through an A/D converter 62 to the adjustment means 58. The output of the adjustment means 58 is fed as another input to the function block 56. It should be clear to those skilled in the art that the functional relationships set forth in the block 56 and the adjustment means 38 can be programmed into the microprocessor via the program 40 to step through a sequence of instructions to command these desired functions. This feature is more fully described in U.S. Ser. No. 80,361.

In operation, the program 40 controls the reading of inputs from the thermistor 34, thermostat 36 and the thermistor 60 via the respective A/D converters 42, 43 and 62 and provides for calculating of a digital signal for driving the A/D converter 57 to regulate the speed of the compressor. Under the control of the microprocessor 38, the control means is operative to vary the indoor fan motor 29 (during heating) in accordance with the program shown in FIG. 2. The proportional gain amplifier 46, the integrater 48 and the second summer 50 provide a control loop with lead compensation for minimizing the error signal from the first summer 44 at steady-state conditions and for cancelling the effect of the lag time in the measured dry bulb temperature reaching the desired condition in response to the change in the compressor speed. The digital filter 52 has been designed to remove any spurious noise in the measured temperature and/or in the operation of the A/D converters 42 and 43.

While the operation of the compressor realizes minimal energy consumption, it may not be sufficient to provide enough heat for the conditioned space such as due to the decreasing temperature in the outdoor atmosphere. In order to further conserve energy, it has been determined that it is better to operate the compressor motor continuously and discretely in the speed range of 25% to a predetermined value in excess of the rated-speed (100% such as up to at least 150% of its full-rated speed or overspeed along the curve B prior to the initiation of supplemental electric heating. Typically, supplemental electric heaters are not necessary until the outdoor temperature drops below a predetermined temperature such as 50° F. This can be utilized as the set point for the adjustment 58. When the outdoor temperature is above 50° F., the supplemental heaters 41 are prevented from turning on by the microprocessor 38. Below the set point temperature of 50° F., the digital signal from the functional block 56 will cause the inverter 30 to drive the compressor motor speed to a speed required to match the heating requirement, up to a maximum of at least 150% of its rated-speed, to provide initial supplemental heating via the control mean 32 prior to turning on of the electric heaters.

Once the outdoor temperature drops below this set point, the microprocessor allows the operation of one or more stages of electric heaters 41 provided the actual measured temperature of the conditioned space is below the reference temperature and the compressor motor is running at its selected maximum speed. The number of stages operating is controlled by the preselected value of the error signal. This can be programmed into the microprocessor 38 so as to cause a sequential turning on of the electric heaters 41a, 41b, and 41c to achieve the desired temperature in the conditioned space. It should be clearly understood by those skilled in the art that while three stages of electric heaters are shown any desired number of electric heaters could be utilized.

From the foregoing description of the heat pump and refrigeration system embodying the present invention, it can be seen that there is provided an apparatus and method for controlling continuously and discretely the speed of the compressor while varying the speed of the indoor condenser fan in accordance with compressor speed and outdoor air temperature in the heating mode. The heat pump and refrigeration system is controlled in its overall operation by a microprocessor having a program to effect control of the measured temperature in a conditioned space. In order to minimize the consumption of energy, the compressor may be operated at least up to 150% of its full rated-speed prior to the initiation of supplemental electric heaters.

Summarizing the operation of the indoor fan speed control, the fan inverter 30 is, in effect, slaved to the compressor inverter 30. The thermistor 34 constitutes a first sensing means for measuring the temperature of the conditioned space. A reference temperature is set by thermostat 36; and thermistor 60 senses outdoor air temperature. The compressor inverter 30 is controlled by a digital signal generated in response to thermistors 34 and 60 and thermostat 36. The indoor coil fan is controlled by a second digital signal related to the first digital signal and, in addition, the outdoor air temperature as sensed at 60.

While there has been illustrated and described what is considered at present to be a preferred embodiment of the present invention, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention but that the invention will include all embodiments falling within the scope of the appended claims.

What is claimed is:

1. A vapor compression cycle heat pump system for conditioning a space and having a closed refrigerant circuit including a compressor, an indoor coil, an expansion device and an outdoor coil connected respectively in series, the system being capable of operation in the heating mode wherein said indoor coil functions as a refrigerant condenser, said system comprising;
    a first sensing means for measuring the actual temperature of a space to be conditioned and generating an electrical signal representative of the measured temperature;
    means for setting a reference temperature of the space to be conditioned and generating a second electrical signal representative of the reference temperature;
    a second sensing means for measuring the temperature of the outdoor atmosphere and generating a third electrical signal representative of the outdoor atmospheric temperature;
    an indoor coil fan to direct air into the conditioned space;
    a variable speed motor driving said indoor coil fan;
    a compressor motor for driving said compressor;
    a first motor speed control means operatively associated with said compressor motor for controlling continuously and discretely the speed thereof between a predetermined minimum speed to a maximum predetermined speed;
    a second motor speed control operatively associated with said indoor coil fan motor for controlling continuously and discretely the speed thereof between a predetermined minimum speed to a maximum predetermined speed;
    programmed control means responsive to said first sensing means, said reference means, and said second sensing means for generating a first digital signal to drive said first motor speed control means, said programmed control means being further responsive to said first digital signal and said second sensing means for generating a second digital signal to drive said second motor speed control means; and
    data processor means having a program coupled to said programmed control means for controlling the operation thereof to effect a predetermined temperature of the conditioned space and relate the speed of said indoor fan motor to the speed of said compressor motor.

2. A heat pump system as defined in claim 1 wherein the speed of said indoor coil fan is proportioned to the speed of said compressor motor over a predetermined range of operation.

3. A heat pump system as defined in claim 2 including means responsive to said third electrical signal for further modifying said indoor coil fan speed.

4. A heat pump system as defined in claim 3 where the proportionality slope of said control is increased as the outdoor atmosphere temperature decreases.

5. A heat pump system as defined in claim 4 where the data processor program establishes a predetermined minimum speed for said indoor coil fan.

6. A method for operating a heat pump system in the heating mode, said system having a closed refrigerant circuit including a compressor, an indoor coil, an expansion device, and an outdoor coil, connected respectively in series, said method comprising the steps of:
    sensing the actual temperature of the space to be conditioned to generate a signal representative of the measured temperature;
    setting a reference temperature of the space to be conditioned to generate a second electrical signal representative of the reference temperature;
    sensing the temperature of the outdoor atmosphere to generate a third electrical signal representative of the outdoor atmospheric temperature;
    providing indoor coil fan motor for driving an indoor coil fan at variable speeds to direct air into the conditioned space;
    providing a compressor motor for driving the compressor;
    connecting a first motor speed control device to the compressor motor for controlling continuously and discretely the speed thereof between a predetermined minimum speed to a maximum predetermined speed;
    connecting a second motor speed control device indoor coil fan motor for controlling continuously and discretely the speed thereof from a predetermined minimum speed to a predetermined maximum speed;
    generating a first digital signal to drive said first motor speed control device in response to the measured temperature, the reference temperature and the outdoor temperature;
    generating a second digital signal to drive said second motor speed control device in response to said outdoor temperature and said first digital signal; and
    controlling through a microprocessor having a program the step of generating said first digital signal to effect the measured temperature of the conditioned space and the step of generating said second digital signal to effect control of said indoor coil fan speed.

* * * * *